(12) United States Patent
Niedrist

(10) Patent No.: US 9,594,091 B2
(45) Date of Patent: Mar. 14, 2017

(54) METHOD OF DETERMINING A ROTOR DISPLACEMENT ANGLE

(71) Applicant: GE Jenbacher GmbH & Co OG, Jenbach (AT)

(72) Inventor: Helmut Niedrist, Salzburg (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 191 days.

(21) Appl. No.: 14/197,743

(22) Filed: Mar. 5, 2014

(65) Prior Publication Data

US 2014/0253104 A1  Sep. 11, 2014

(30) Foreign Application Priority Data

Mar. 8, 2013 (AT) .................................. A 183/2013

(51) Int. Cl.
*G01P 3/48* (2006.01)
*G01D 5/14* (2006.01)
*G01D 5/244* (2006.01)

(52) U.S. Cl.
CPC .................. *G01P 3/48* (2013.01); *G01D 5/14* (2013.01); *H02K 11/20* (2016.01); *H02P 6/17* (2016.02); *G01D 5/2449* (2013.01)

(58) Field of Classification Search
None
See application file for complete search history.

(56) References Cited

U.S. PATENT DOCUMENTS

| 6,441,572 B2 * | 8/2002 | Batzel ..................... H02P 6/185 |
| | | 318/400.12 |
| 2006/0005605 A1 | 1/2006 | Moriarty |
| 2006/0125439 A1 * | 6/2006 | Ajima ..................... B60K 6/26 |
| | | 318/716 |

(Continued)

FOREIGN PATENT DOCUMENTS

| AT | 351 097 | 7/1979 |
| CN | 1719718 A | 1/2006 |

(Continued)

OTHER PUBLICATIONS

Translation of DE102010001248A1.*

(Continued)

*Primary Examiner* — Jermele M Hollington
(74) *Attorney, Agent, or Firm* — Wenderoth, Lind & Ponack, L.L.P.

(57) ABSTRACT

A method of determining a rotor displacement angle of a synchronous generator having a rotor and electrically connected to a power supply network uses at least one rotary speed measuring device. During a revolution of the rotor, in particular during each revolution of the rotor, the measuring device communicates at least one rotary speed signal to an evaluation unit. A frequency measuring device communicates a frequency signal to the evaluation unit for each period duration of a voltage signal of the power supply network. A time duration between communication of the rotary speed signal and communication of the frequency signal is determined by the evaluation unit, and the rotor displacement angle is inferred in dependence on the determined time duration.

13 Claims, 4 Drawing Sheets

(56) References Cited

U.S. PATENT DOCUMENTS

Figure 1:
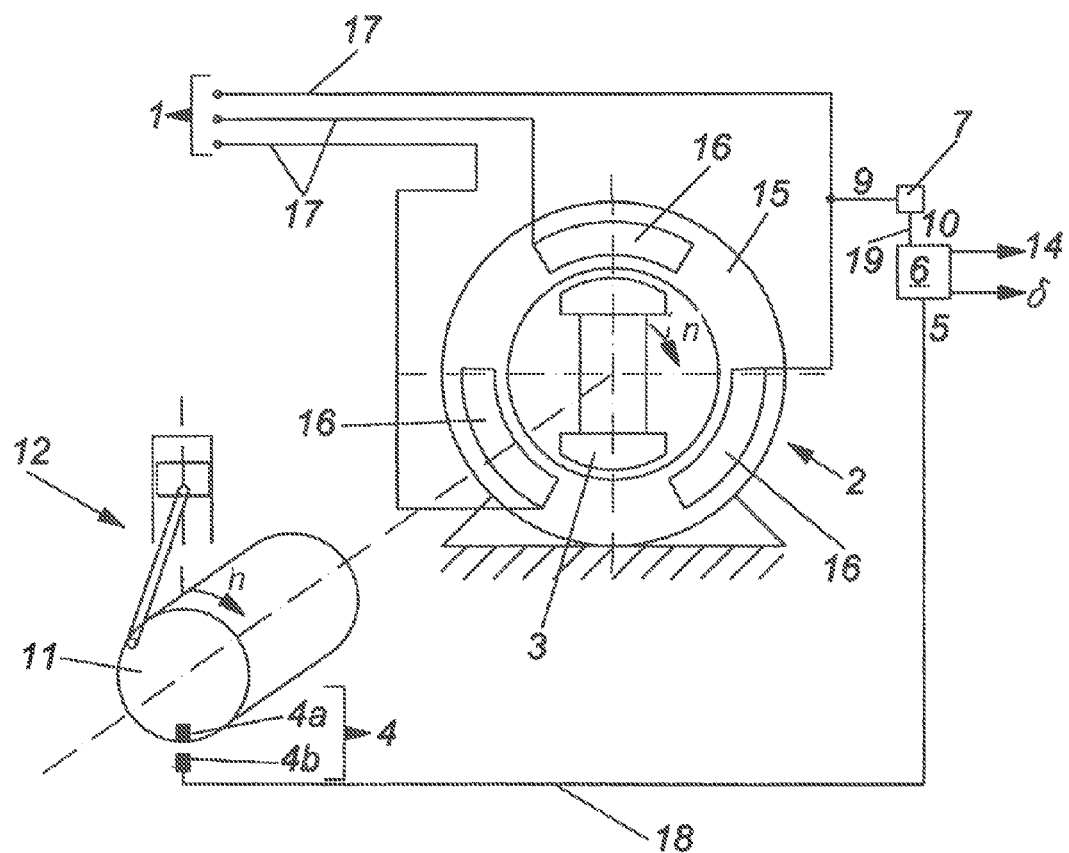

| | | | | |
|---|---|---|---|---|
| 2008/0309267 A1* | 12/2008 | Cheng | ............... | B60L 15/02 |
| | | | | 318/400.04 |
| 2011/0130996 A1* | 6/2011 | Blind | ............... | H02P 25/024 |
| | | | | 702/94 |
| 2014/0152219 A1* | 6/2014 | Niederer | ............ | H02P 6/187 |
| | | | | 318/400.34 |
| 2014/0252899 A1* | 9/2014 | Looser | ............ | F16C 32/0402 |
| | | | | 310/90.5 |

FOREIGN PATENT DOCUMENTS

| | | |
|---|---|---|
| CN | 101299058 | 11/2008 |
| CN | 102017391 A | 4/2011 |
| DE | 10 2008 001 408 A1 | 10/2009 |
| DE | 10 2010 001 248 | 7/2011 |
| EP | 1 416 623 A1 | 5/2004 |

OTHER PUBLICATIONS

European Search Report issued Jun. 23, 2014 in corresponding European Application No. 14000507.5.
Austrian Patent Office Search Report (ASR) issued Jan. 29, 2014 in Austrian Patent Application No. A 183/2013.
English translation of Chinese Search Report (CSR) issued Feb. 22, 2016 in corresponding Chinese Application No. 201410081778.X.

* cited by examiner

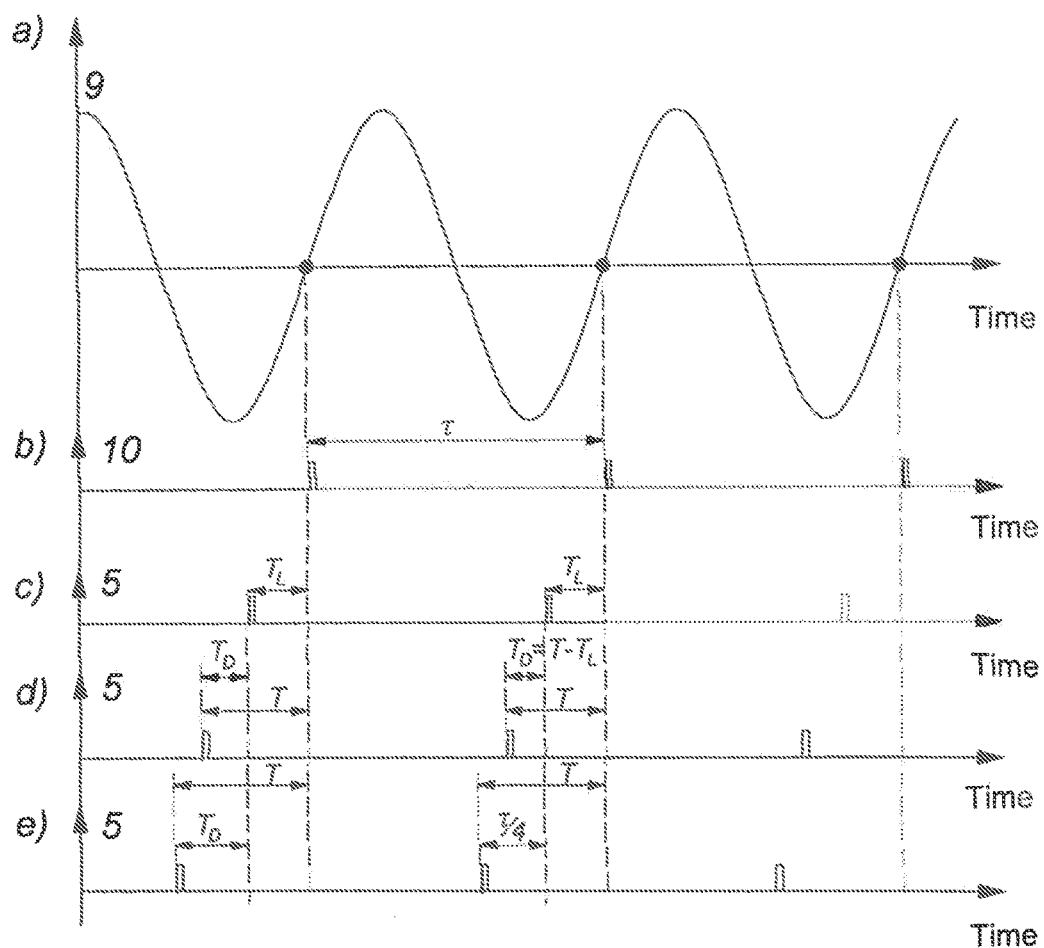

METHOD OF DETERMINING A ROTOR DISPLACEMENT ANGLE

The invention concerns a method of determining a rotor displacement angle of a synchronous generator having a rotor and electrically connected to a power supply network, wherein there is provided at least one rotary speed measuring device which during a revolution of the rotor, in particular during each revolution of the rotor, communicates at least one rotary speed signal to an evaluation unit, wherein there is provided a frequency measuring device which communicates a frequency signal to the evaluation unit for each period duration of a voltage signal of the power supply network, wherein a time duration between communication of the rotary speed signal and communication of the frequency signal is determined by the evaluation unit, wherein the rotor displacement angle is inferred in dependence on the determined time duration.

When using synchronous generators electrically connected to a power supply network capacitive operation of the synchronous generators is often required. In that case the delivered capacitive reactive power of the synchronous generator is to be increased to such an extent that for example it is possible to achieve a power factor of cos φ<0.95 cap. An increase in capacitive reactive power can be achieved by underexcitation of the synchronous generator, in which case however this inevitably approaches the stability limit of the synchronous generator.

In that respect a measurement in respect of stability of the synchronous generator mode of operation is known to be the rotor displacement angle. In the case of synchronous generators connected to a power supply network the rotor displacement angle or load angle expresses the departure of the magnetic poles on the rotor of the synchronous generator from the magnetic poles on the stator of the synchronous generator. In that case the magnetic poles on the rotor are usually produced by a DC-fed exciter winding on the rotor and the magnetic poles on the stator of the synchronous generator are produced by the electrical voltage of the power supply network which is typically of a three-phase nature, that voltage being applied to corresponding windings on the stator. In the phasor model the rotor displacement angle therefore describes the angle between the stator voltage and the rotor voltage, wherein the rotor voltage in the synchronous generator mode of operation leads the stator voltage. Upon a rising load due to the power supply network, that is to say with increased power provision by the synchronous generator, that rotor displacement angle increases. If the rotor displacement angle becomes too great that leads to instability of the synchronous generator.

To determine the rotor displacement angle it is known for example from DE 10 2010 001 248 A1 to infer the rotor displacement angle by way of the detected time between the occurrence of a rotary speed signal from the rotor of the synchronous generator and the occurrence of a voltage zero crossing of a voltage signal of the power supply network. However complicated and laborious calibration is necessary for the method described therein. Thus certain relevant points within the voltage variation must be associated with a target rotary position of the rotor and as a further consequence a sensor of the rotary speed measuring device has to be appropriately fitted to the rotor so that it generates an output signal when the target rotary position of the rotor is reached. In other words, in each calibration operation, the sensor of the rotary speed measuring device has to be placed precisely at a location to be determined in the synchronous generator so that the method operates.

The object of the invention is to provide a method of determining the rotor displacement angle, which is improved over the state of the art. In particular the invention seeks to provide that calibration of the method is simplified.

According to the invention that object is attained by the features of claim 1. Advantageous configurations of the invention are recited in the appendant claims.

According to the invention therefore it is provided that for calibration of the method the determined time duration is stored after synchronisation of the synchronous generator with the power supply network has been effected and substantially without load application to the synchronous generator as a no-load time duration in the evaluation unit, wherein to determine the rotor displacement angle a differential time is formed from the determined time duration less the no-load time duration, wherein the rotor displacement angle is inferred in dependence on the differential time.

With the absence of a load acting on the synchronous generator that is to say in the no-load condition of the synchronous generator the rotary displacement angle is 0 degrees. Thus the time duration between communication of the rotary speed signal and communication of the frequency signal, that is determined after synchronisation of the synchronous generator with the power supply network has been effected, can be used in the no-load condition as a reference value for the subsequent operation of determining the rotary displacement angle under load of the synchronous generator. That time duration determined under the no-load condition is stored in the evaluation unit as a no-load time duration. For ascertaining the prevailing rotor displacement angle that reference time or no-load time duration is respectively deducted from the determined time duration, whereby the proposed method is independent of the geographical placement of a sensor of the rotary speed measuring device, that is to say the rotary speed measuring device can be arranged just as desired. In other words, in calibration of the proposed method, the operation of determining a precise location at which the sensor of the rotary speed measuring device must be placed so that the method operates is eliminated. A sensor of the rotary speed measuring device can be placed at any desired location as a correction of the method in regard to placement of the sensor is effected by determining and using the no-load time duration for determining the rotor displacement angle.

The frequency signal can be the respective maximum value of the stator voltage for each period duration of the voltage signal or preferably the respective (for example positive) voltage zero crossing. It is desirable if precisely one frequency signal is communicated to the evaluation unit per period duration of the voltage signal. In that case, with a power supply network with an operating frequency of 50 Hertz (Hz), a frequency signal is passed to the evaluation unit every 20 milliseconds (ms).

The proposed method also functions independently of the number of poles of the synchronous generator and the number of sensors of the rotary speed measuring device as the proposed calibration always implements a correction in relation to the prevailing factors. Thus for example with a two-pole synchronous generator with a rotary speed sensor positioned at any location on the rotor of the synchronous generator, a rotor displacement angle determining operation is performed for each period duration of the voltage signal. With a four-pole synchronous generator with only one rotary speed sensor on the rotor a rotor displacement angle determining operation is effected for example every two period durations of the voltage signal. If a four-pole synchronous generator is equipped for example with two rotary speed sensors on the rotor, that are arranged displaced through 180 degrees, then a rotor displacement angle determining operation would again be effected for each period duration of the voltage signal. In all these variants the proposed calibration operation leads to an automatic correction in regard to the prevailing factors.

In a particularly preferred embodiment it can be provided that the rotor is mechanically rigidly connected to an engine shaft of an internal combustion engine, in particular a gas engine, wherein the at least one rotary speed measuring device communicates the at least one rotary speed signal to the evaluation unit for each revolution of the engine shaft or a camshaft of the internal combustion engine. That has the advantage that rotary speed measuring devices which are usually already present in internal combustion engines can be used as signalling devices for the rotary speed signal. Thus for example sensors arranged at the crankshaft or camshaft of the internal combustion engine can signal the rotary speed signal to the evaluation unit. In this case also it is possible to dispense with having to place the corresponding sensors at precisely defined positions, by virtue of the proposed calibration operation.

In other words it can be provided that the at least one rotary speed measuring device includes a sensor, wherein the sensor can be arranged as desired along a periphery of the rotor or along a periphery of the engine shaft and the at least one rotary speed measuring device includes a signalling device co-operating with the sensor, wherein the signalling device can be arranged as desired along a periphery of a stator of the synchronous generator or at a housing of the internal combustion engine.

In addition it is also possible by means of the proposed calibration operation to use a sensor or pickup at the camshaft of the internal combustion engine as a signalling device for the rotary speed signal. With a power supply network with an operating frequency of 50 Hz the period duration of the voltage signal is 20 ms. The camshaft of the internal combustion engine can rotate for example at 750 revolutions per minute. A sensor arranged at the camshaft would then deliver a rotary speed signal only every 80 ms. As however it can be provided that it is only ever the communicated rotary speed signal that is the trigger for determining the time duration between communication of the rotary speed signal and communication of the frequency signal, in that case a rotor displacement angle determining operation would take place every four period durations of the voltage signal. Here once again calibration would provide that the operation of determining the rotor displacement angle is possible without further mechanical interventions or adjustments.

In general in the case of synchronous generators with a plurality of poles p it can be provided that the operation of determining the actual rotor displacement angle occurs only once per revolution of the rotor, that is to say every p period durations. For example a rotary speed measuring device at a rotor rotating at 750 revolutions per minute would deliver a signal only every 80 ms and with a 50 Hz network frequency only every fourth voltage zero crossing would be evaluated. By increasing the number of rotary speed measuring devices or sensors at the rotor it is possible for the accuracy of measurement to be increased just as desired in particular for slowly operating synchronous generators. A plurality of sensors (pickups) at the rotor should preferably be distributed uniformly at the periphery, but it is also possible to adopt any arrangement of the rotary speed measuring devices with individual calibration as proposed.

In a preferred embodiment of the invention it can be provided that the differential time is proportionally converted into degrees of rotor displacement angle, wherein a value of the differential time of substantially zero seconds corresponds to a rotor displacement angle of 0 degrees and a value of the differential time of substantially a quarter of the period duration of the voltage signal of the power supply network corresponds to a rotor displacement angle of 90 degrees. A rotor displacement angle of 90 degrees represents the theoretical pole slippage limit. If that is exceeded that results in instability of the synchronous generator, in which case the mechanical power introduced by the internal combustion engine by way of the engine shaft connected to the rotor can no longer be converted into electrical power as desired and the internal combustion engine begins to slip.

With a power supply network with an operating frequency of 50 Hz the period duration of the voltage signal is 20 ms. In the phasor diagram that corresponds to a full revolution of the voltage vector of 360 degrees. A quarter of that period duration (corresponds to 90 degrees) is 5 ms in such a network. A determined differential time of 5 ms would therefore correspond to a rotor displacement angle of 90 degrees.

With a power supply network with an operating frequency of 60 Hz the period duration of the voltage signal is 16.667 ms. A quarter of that is 4.167 ms. A determined differential time of 4.167 ms would therefore correspond to a rotor displacement angle of 90 degrees in such a network.

Therefore, by virtue of incorporating the prevailing operating frequency of the power supply network the proposed method can be used in conjunction with power supply networks involving different operating frequencies.

A particular variant provides that with a determined rotor displacement angle of more than 5 degrees, preferably more than 7 degrees, a warning signal is outputted by the evaluation unit to signal a threatening slippage. In that way it is already possible to react in good time at an early stage, still before the occurrence of actual pole slippage—which can cause considerable damage to synchronous generator and internal combustion engine—and for example the synchronous generator can be separated from the power supply network or the exciter voltage can be increased.

As the locus curve usually specified by a synchronous generator manufacturer with the pole slippage limit only applies for a given nominal voltage and in addition often includes reserves of unknown magnitude, it is possible to operate the synchronous generator closer to its pole slippage limit by determining the actually prevailing rotor displacement angle in accordance with the proposed method. In that way the synchronous generator can be better utilised in the capacitive operating range without having to over-size the synchronous generator which is costly.

As the period durations of the voltage signals of the power supply network may be subject to certain fluctuations it is advantageous for the accuracy of determining the rotor displacement angle to incorporate those fluctuations into the operation of determining the rotor displacement angle. Therefore that embodiment of the invention is particularly advantageous in which, to take account of a network frequency fluctuation in respect of the voltage signal of the power supply network upon or during the operation of determining the time duration between communication of the rotary speed signal and communication of the frequency signal an actual period duration of the voltage signal is determined, wherein at least one correction factor formed from a predeterminable theoretical period duration fractionised by the actual period duration is determined, wherein the determined time duration is multiplied by the at least one correction factor.

In that respect the predeterminable theoretical period duration can be for example 20 ms with a power supply network involving an operating frequency of 50 Hz while with a power supply network involving an operating frequency of 60 Hz it can be 16.667 ms. The actual period duration of the voltage signal can preferably be ascertained by measuring a time difference between two successive frequency signals.

In that respect a particular variant of the invention can provide that a correction factor is formed upon or during the operation of determining the no-load time duration, wherein the no-load time duration is multiplied by the correction factor and stored as a standardised no-load time duration in the evaluation unit. In addition it can be provided that a correction factor is formed upon or during the operation of determining the differential time, wherein a standardised time duration is formed by multiplication of the determined time duration by the correction factor, wherein to determine the rotor displacement angle a standardised differential time is formed from a standardised time duration less a standardised no-load time duration, wherein the rotor displacement angle is inferred in dependence on the standardised differential time.

In other words, to take account of fluctuations in the period durations of the voltage signals of the power supply network initially upon calibration of the proposed method, the actually prevailing period duration of the voltage signal can be detected, the determined time duration between communication of the rotary speed signal and communication of the frequency signal can be standardised by means of a correction factor in regard to the predeterminable theoretical period duration and stored in the evaluation unit as a standardised no-load time duration. Then, to determine a respective rotor displacement angle, in the subsequent operations of determining the time durations, the respective actually prevailing period duration of the voltage signal can also be detected and the respective determined time duration can be standardised to the predeterminable theoretical period duration by means of the correction factor. The difference between the standardised time duration and the standardised no-load time duration gives a standardised differential time in regard to the predeterminable theoretical period duration, from which the rotor displacement angle can be inferred.

Figure 2:
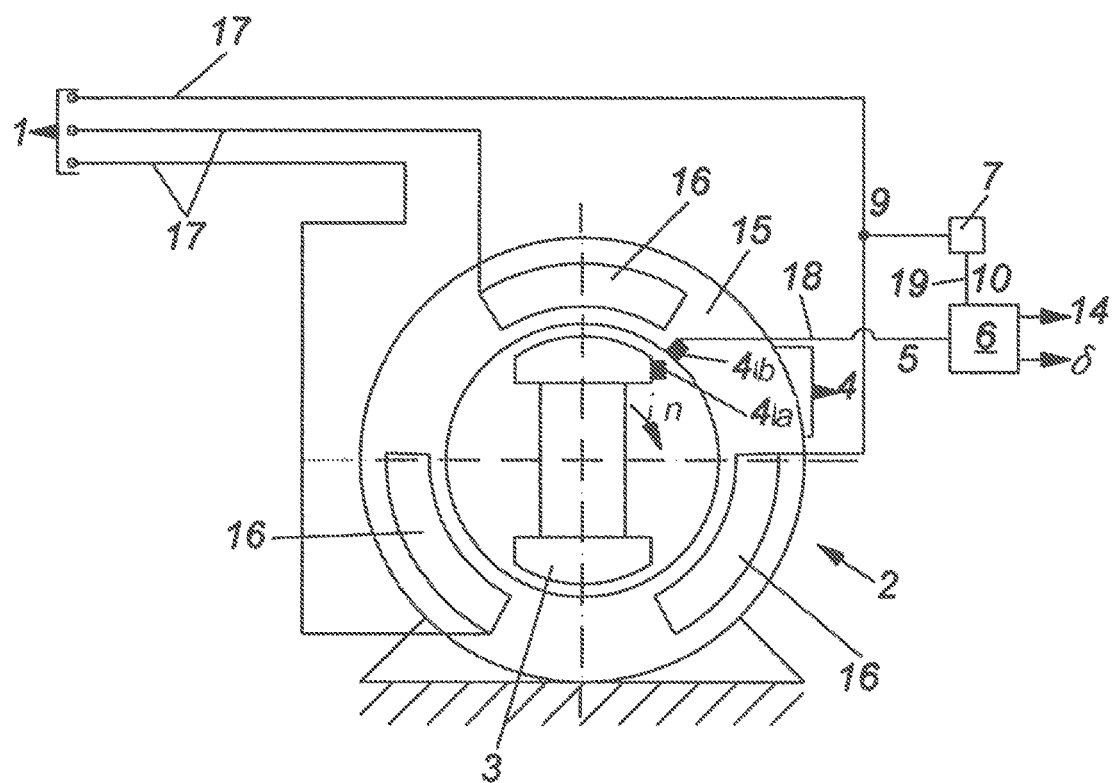
Figure 4A:
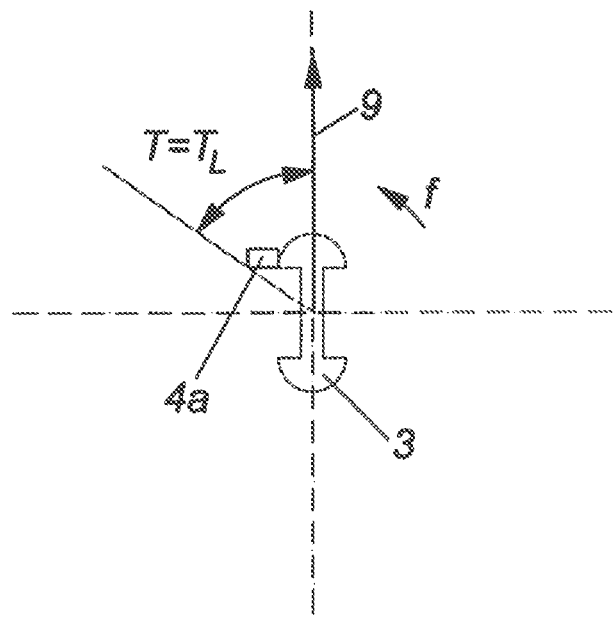
Figure 4B:
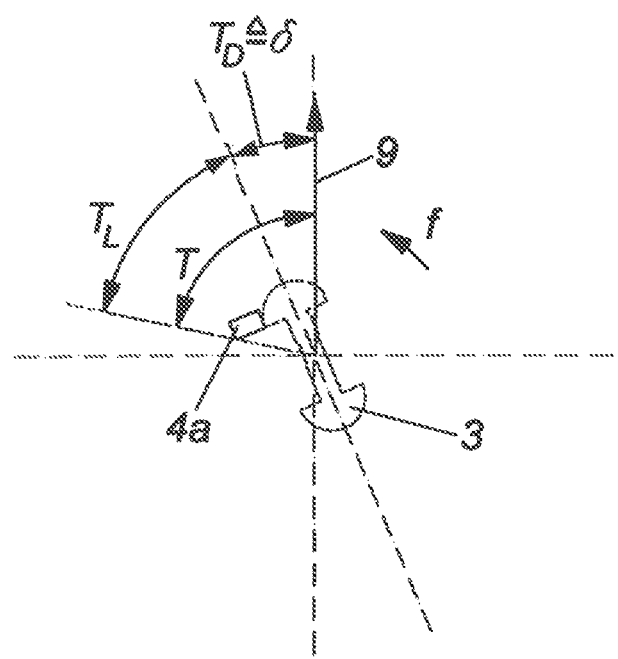

Further details and advantages of the present invention will now be described by means of the specific description hereinafter. In the drawing:

FIG. 1 shows a synchronous generator connected to an internal combustion engine and an evaluation unit for determining the rotor displacement angle, FIG. 2 shows a synchronous generator and an evaluation unit for determining the rotor displacement angle, FIGS. 3a through 3e show variations in respect of time in a voltage signal, a frequency signal and rotary speed signals at different modes of operation of a synchronous generator, FIG. 4a shows a phasor diagram of a synchronous generator with rotary speed measuring device arranged just as desired in the no-load condition and FIG. 4b shows a phasor diagram as shown in FIG. 4a with a load at the synchronous generator.

FIG. 1 diagrammatically shows a synchronous generator 2 including a stator 15 and a rotor 3 rotatable relative to the stator 15. Three stator windings 16 are arranged in known manner on the stator 15 and are connected to the three phases 17 of a three-phase power supply network 1. In this example the rotor 3 is of a two-pole nature and is rigidly or non-rotatably connected to an engine shaft 11 of an internal combustion engine 12—which for example can be in the form of a stationary gas engine. The engine shaft 12 rotates at a rotary speed n. A rotary speed measuring device 4 is arranged at the internal combustion engine 12. The rotary speed measuring device 4 is in the form of a rotary speed sensor which is known in the state of the art and which includes a sensor or pickup 4a arranged at the engine shaft 11 and a signalling device 4b arranged in positionally stable relationship at the housing of the internal combustion engine 12 and which passes a rotary speed signal 5 to an evaluation unit 6 by way of a first signal line 18 in each revolution of the engine shaft 11. Equally, a frequency signal 10 is passed to the evaluation unit 6 by a frequency measuring device 7 connected to a phase 17 of the power supply network 1, for each period duration τ of a voltage signal 9 of the corresponding phase 17, by way of a second signal line 19.

In order now to determine the rotor displacement angle δ, firstly for calibration after synchronisation of the synchronous generator 2 with the power supply network 1 and in a no-load condition of the synchronous generator 2 a time duration T between communication of the rotary speed signal 5 and communication of the frequency signal 10 is determined by the evaluation unit 6 and stored in the evaluation unit 6 as a no-load time duration $T_L$. For that calibration operation it is important that the synchronous generator 2 is in the no-load condition—that is to say substantially without a load thereon. After calibration has been effected, to determine the rotor displacement angle δ, a differential time $T_D$ can now be formed from the determined time duration T between communication of the rotary speed signal 5 and communication of the frequency signal 10, less the stored no-load time duration $T_L$, in which case it is possible to infer the rotor displacement angle δ in dependence on the differential time $T_D$.

When there is a load on the synchronous generator 2 the rotor displacement angle δ increases to theoretically 90 degrees (theoretical slippage limit) as the internal combustion engine 12 urges the pole wheel member or rotor 3 forwardly in the direction of the rotation of the engine shaft 11, in the generator mode of operation of the synchronous generator 2. In that case the rotary speed signal 5 occurs earlier and earlier in comparison with the frequency signal 10, whereby the time duration T between communication of the rotary speed signal 5 and communication of the frequency signal 10 increases, more specifically substantially proportionally to the adjusting rotor displacement angle δ.

With a power supply network 1 involving an operating frequency of 50 Hz and with a theoretical maximum of the rotor displacement angle δ of 90 degrees therefore the time duration T would be the no-load time duration $T_L$ plus 5 ms. In general therefore the differential time $T_D$ can be formed from the detected time duration T less the no-load time duration $T_L$ and the rotor displacement angle δ can be determined by the proportionality between the differential time $T_D$ and the rotor displacement angle δ. If the operation of determining the time duration T is performed with an adequate level of resolution and accuracy—for example with a resolution of about 0.1 ms—the rotor displacement angle δ can be determined substantially with an accuracy of one degree. With a power supply network 1 involving an operating frequency of 50 Hz a differential time $T_D$ of 5 ms (a quarter of the period duration τ of a voltage signal 9) corresponds to a rotor displacement angle δ of 90 degrees. Accordingly a rotor displacement angle δ of 1 degree corresponds to a differential time $T_D$ of 0.055 ms.

The determined rotor displacement angle δ can be outputted by the evaluation unit 6, for example to a higher-level control or regulating system. To signal a threat of pole slippage it can be provided that a warning signal 14 is outputted by the evaluation unit 6 upon a determined rotor displacement angle δ of about 8 degrees.

In general the rotary speed measuring device 4 can also be arranged at other parts of the internal combustion engine 12—which represent a mechanical rotational frequency—or at the synchronous generator 2. Thus it is for example conceivable for the rotary speed measuring device 4 to be arranged at a crankshaft or camshaft of the internal combustion engine 12.

FIG. 2 shows a synchronous generator 2 as shown in FIG. 1, with the difference that in this example the rotary speed measuring device 4 is arranged at the synchronous generator 2 itself, instead of at the internal combustion engine 12 as in FIG. 1. In this example the rotary speed measuring device 4 includes a sensor or pickup 4a arranged at the rotor 3, and a signalling device 4b arranged at the stator 15. The rotor 3 rotates at a rotary speed n. Each time the pickup 4a passes the signalling device 4b a rotary speed signal 5 is passed to the evaluation unit 6.

FIG. 3a shows by way of example the voltage variation in a voltage signal 9 of a phase of a power supply network 1. A frequency measuring device 7 (see FIG. 1) connected to the phase 17 supplies a frequency signal 10 at each positive zero crossing of the voltage signal 9 and communicates same to the evaluation unit 6. As can be seen from FIG. 3b therefore a frequency signal 10 is communicated to the evaluation unit 6 at each period duration τ of the voltage signal 9.

FIG. 3c shows the variation in respect of time of a signal 5 communicated to the evaluation unit 6 by the rotary speed measuring device 4 shown in FIG. 1 or FIG. 2, in the no-load condition of the synchronous generator 2. Depending on the respective geographical arrangement of the rotary speed measuring device 4, in a no-load condition, there is a given no-load time duration $T_L$ between communication of the rotary speed signal 5 and communication of the frequency signal 10. That no-load time duration $T_L$ can be stored in the evaluation unit 6 and used to determine the rotor displacement angle δ when the synchronous generator 2 is under load.

FIG. 3d shows the variation in respect of time of the rotary speed signal 5 as shown in FIG. 3c when the synchronous generator 2 is under load. Under load there is a rotor displacement angle δ which is expressed by the rotary speed signal 5 now being communicated earlier in comparison with the no-load condition. That gives a time duration T, that is changed in relation to the no-load situation, between communication of the rotary speed signal 5 and communication of the frequency signal 10. To determine the rotor displacement angle δ the no-load time duration $T_L$ is now deducted from the determined time duration T, thereby giving a differential time $T_D$ corresponding to the rotor displacement angle δ.

FIG. 3e shows the variation in respect of time of the rotary speed signal 5 shown in FIG. 3c, at the slippage limit corresponding to a rotor displacement angle of 90 degrees. A rotor displacement angle δ of 90 degrees in turn corresponds to a differential time $T_D$ of a quarter of the period duration τ of the voltage signal 9.

The variations in respect of time in FIGS. 3a through 3e refer to a configuration of the proposed method, in which the time duration T from communication of the rotary speed signal 5 to communication of the frequency signal 10 is determined. It will be appreciated that the proposed method can also be so configured that the time duration T from communication of the frequency signal 10 to communication of the rotary speed signal 5 is determined.

FIG. 4a diagrammatically shows the pole wheel member or rotor 3 of a synchronous generator 2 with pickup 4a arranged thereon of a rotary speed measuring device 4, with the superimposition of a vector diagram of the voltage signal 9 of a phase 17 of a power supply network 1 in the no-load condition. The arrow bearing reference f shows the direction of rotation of the phasor diagram. In the no-load condition the rotor displacement angle δ is substantially 0 degrees, as is known. Depending on the respective geographical placement of the rotary speed measuring device 4 or its pickup 4a and pulse transmitting device 4b, between communication of the rotary speed signal 5 and communication of the frequency signal 10 there is a no-load time duration $T_L$ which can be stored in the evaluation unit 6.

FIG. 4b shows the diagrammatic view of FIG. 4a, with the synchronous generator 2 under load. In this case, in known manner, the pole wheel member or rotor 3 of the synchronous generator 2 is urged forwardly in the direction of the vector rotation f in relation to the vector of the voltage signal 9, in the phasor diagram. That gives a time duration T that is increased in relation to the no-load condition between communication of the rotary speed signal 5 and communication of the frequency signal 10. By deducting the no-load time duration $T_L$ from that determined time duration T, that gives the differential time $T_D$ which corresponds to the rotor displacement angle δ.

The invention claimed is:

1. A method of determining a rotor displacement angle of a synchronous generator having a rotor and electrically connected to a power supply network, the method comprising:

during a revolution of the rotor, communicating at least one rotary speed signal to an evaluation unit using at least one rotary speed measuring device;

communicating a frequency signal to the evaluation unit for each period duration of a voltage signal of the power supply network using a frequency measuring device;

determining a time duration between the communication of the rotary speed signal and the communication of the frequency signal using the evaluation unit;

inferring the rotor displacement angle based on the determined time duration;

determining a no-load time duration;

storing, for calibration, the determined time duration as the no-load time duration in the evaluation unit, after synchronisation of the synchronous generator with the power supply network has been effected and substantially without load application to the synchronous generator;

determining the rotor displacement angle, using a differential time formed from the determined time duration less the no-load time duration; and inferring the rotor displacement angle based on the differential time.

2. A method as set forth in claim 1, further comprising:

mechanically rigidly connecting the rotor to an engine shaft of an internal combustion engine; and communicating, using the at least one rotary speed measuring device, the at least one rotary speed signal to the evaluation unit for each revolution of the engine shaft or a camshaft of the internal combustion engine.

3. A method as set forth in claim 2, wherein the at least one rotary speed measuring device includes a sensor, and the method further comprises arranging the sensor along a periphery of the rotor or along a periphery of the engine shaft.

4. A method as set forth in claim 3, wherein the at least one rotary speed measuring device includes a signalling device co-operating with the sensor, and the method further comprises arranging the signalling device along a periphery of a stator of the synchronous generator or at a housing of the internal combustion engine.

5. A method as set forth in claim 2, wherein the internal combustion engine comprises a gas engine.

6. A method as set forth in claim 1, further comprising:
proportionally converting the differential time into degrees of the rotor displacement angle, wherein a value of the differential time of substantially zero seconds corresponds to a rotor displacement angle of 0 degrees and a value of the differential time of substantially a quarter of the period duration of the voltage signal of the power supply network corresponds to a rotor displacement angle of 90 degrees.

7. A method as set forth in claim 1, further comprising:
outputting, using the evaluation unit, a warning signal to signal a threatening pole slippage when the rotor displacement angle is determined to be of more than 5 degrees.

8. A method as set forth in claim 7, wherein the rotor displacement angle of more than 5 degrees comprises a rotor displacement angle of more than 7 degrees.

9. A method as set forth in claim 1, further comprising:
determining an actual period duration of the voltage signal, so as to take account of a network frequency fluctuation with respect to the voltage signal of the power supply network upon or during the operation of determining the time duration between the communication of the rotary speed signal and the communication of the frequency signal; and
determining at least one correction factor formed from a predeterminable theoretical period duration fractionised by the actual period duration, wherein the determined time duration is multiplied by the at least one correction factor.

10. A method as set forth in claim 9, further comprising:
determining the actual period duration of the voltage signal by measurement of a time difference between two successive frequency signals.

11. A method as set forth in claim 9, further comprising:
forming a correction factor upon or during the operation of determining the no-load time duration;
multiplying the no-load time duration by the correction factor; and
storing, in the evaluation unit, the multiplied no-load time duration as a standardised no-load time duration.

12. A method as set forth in claim 9, further comprising:
forming a correction factor upon or during the operation of determining the differential time;
forming a standardised time duration by multiplication of the determined time duration by the correction factor;
determining the rotor displacement angle by forming a standardised differential time from a standardised time duration less a standardised no-load time duration; and
inferring the rotor displacement angle based on the standardised differential time.

13. A method as set forth in claim 1, wherein the revolution of the rotor comprises each revolution of the rotor.

* * * * *